(12) United States Patent
Zambo et al.

(10) Patent No.: US 10,217,159 B2
(45) Date of Patent: Feb. 26, 2019

(54) SHARED TRANSACTIONS

(71) Applicant: NCR Corporation, Duluth, GA (US)

(72) Inventors: Robyn Cortes Zambo, Mandaue (PH); Ferdinand Salarda Acedera, Cebu (PH); Joseph Jover Piñon Mendoza, Cebu (PH)

(73) Assignee: NCR Corporation, Atlanta, GA (US)

( * ) Notice: Subject to any disclaimer, the term of this patent is extended or adjusted under 35 U.S.C. 154(b) by 722 days.

(21) Appl. No.: 14/833,626

(22) Filed: Aug. 24, 2015

(65) Prior Publication Data

US 2017/0061523 A1 Mar. 2, 2017

(51) Int. Cl.
*G06Q 30/06* (2012.01)
*G06Q 50/12* (2012.01)

(52) U.S. Cl.
CPC ..... *G06Q 30/0635* (2013.01); *G06Q 30/0633* (2013.01); *G06Q 50/12* (2013.01)

(58) Field of Classification Search
None
See application file for complete search history.

(56) References Cited

U.S. PATENT DOCUMENTS

| | | | | |
|---|---|---|---|---|
| 8,498,900 | B1 * | 7/2013 | Spirin | G06Q 50/00 340/286.09 |
| 8,626,590 | B2 * | 1/2014 | Istfan | G06Q 10/10 705/15 |
| 9,269,103 | B1 * | 2/2016 | Kumar | G06Q 30/0605 |
| 9,721,314 | B2 * | 8/2017 | Rose | G06Q 50/12 |
| 9,754,331 | B1 * | 9/2017 | Beckelman | G06Q 50/12 |
| 9,842,342 | B2 * | 12/2017 | Harman | G06Q 30/0201 |
| 2004/0054592 | A1 * | 3/2004 | Hernblad | G06Q 20/32 705/15 |
| 2004/0239498 | A1 * | 12/2004 | Miller | G08B 25/016 340/539.13 |
| 2005/0080902 | A1 * | 4/2005 | Parupudi | G06F 17/3087 709/226 |
| 2007/0203801 | A1 * | 8/2007 | Istfan | G06Q 10/10 705/26.1 |

(Continued)

FOREIGN PATENT DOCUMENTS

WO 2015/023713 A2 * 2/2015

OTHER PUBLICATIONS

Berthiaume, D., "Predictions: Experts Share Insights on Key Trends Issues," Chain Store Age, 90.8: 20(4), Dec. 2014.*

*Primary Examiner* — Nicholas D Rosen
(74) *Attorney, Agent, or Firm* — Schwegman, Lundberg & Woessner

(57) ABSTRACT

Various embodiments herein each include at least one of systems, devices, methods, and software for shared transactions. One method embodiment includes determining whether there are open orders with regard to a location included in first order input received via a network. When there is an open order with regard to the location, the method then transmits a request for second order input indicating whether to add the order input to the at least one open order or to open a new order. When the received second order input specifies that a new order is to be opened, the method opens a new order with regard to the location. When the received second order input specifies that the received first order input is to be added an open order, the method includes adding the first order input to an open order.

17 Claims, 4 Drawing Sheets

(56) References Cited

U.S. PATENT DOCUMENTS

| | | | | |
|---|---|---|---|---|
| 2007/0250420 A1* | 10/2007 | Sears | G06Q 30/04 | 705/34 |
| 2012/0036028 A1* | 2/2012 | Webb | G06Q 30/06 | 705/15 |
| 2012/0290390 A1* | 11/2012 | Harman | G06Q 30/06 | 705/14.53 |
| 2015/0120344 A1* | 4/2015 | Rose | G06Q 50/12 | 705/5 |
| 2016/0055598 A1* | 2/2016 | Ramini | G06Q 50/12 | 705/15 |
| 2016/0180476 A1* | 6/2016 | Talwar | G06Q 50/12 | 705/5 |
| 2016/0283989 A1* | 9/2016 | Esquilla, Jr. | G06Q 30/0281 | |

* cited by examiner

SHARED TRANSACTIONS

BACKGROUND INFORMATION

At retail outlets, customers often wait to order items and to pay for ordered items and services. This is true even at restaurants where there may be a line at a point of sale terminal, a long wait time at a table to order and for staff to return with a check and then to return with proper change or a bankcard used to pay. Long wait times to order can set the tone for a bad retail experience. Further, despite the quality of the retail experience up to the point of payment, customers are often left with a bad experience in their minds when the final payment portion of their experience is negative.

SUMMARY

Various embodiments herein each include at least one of systems, devices, methods, and software for shared transactions. Some such embodiments may be implemented at retail outlets (e.g., restaurants, salons, stores, etc.) to allow customers to order items, add items to an order at a later time when a new guest arrives, split a bill, and pay all without direct interaction in these regards with retail outlet staff.

One embodiment, in the form of a method that may be performed on a mobile device, such as a mobile device of a customer or as provided at a location such as a table in a retail outlet, includes determining a location of a mobile device within a mobile device app that executes on the mobile device. The determined location is typically associated with a serving location, such as a dining table, a location within a store, or other location where ordered items may be delivered. This method further includes receiving order input within a user interface of the mobile device app of at least one order item and transmitting, via a network from the mobile device app on the mobile device to a backend system, the first beacon identifier, customer account identifying data to associate a session at the serving location with the customer account, and data representative of the received order input. This method then receives a request from the backend system to add additional order input with regard to another individual that has requested the backend system to add the additional order input to the session. Approval input may then be received within a user interface of the mobile device app approving or denying the received request. Data representative of the approval input is then transmitted, via the network from the mobile device app on the mobile device to the backend system.

Another embodiment, in the form of a method that may be performed on a server includes determining whether there are any open orders with regard to a location included in first order input received via a network. When there is at least one open order with regard to the location, the method then transmits a request for second order input indicating whether to add the order input to the at least one open order or to open a new order. When the received second order input specifies that a new order is to be opened, the method includes opening a new order with regard to the location based on the first order input. When the received second order input specifies that the received first order input is to be added to one of the at least one open orders, the method includes adding the first order input to one of the at least one open orders.

A further embodiment, in the form of a system, such as a server on which backend server software executes, includes at least one network interface device, at least one processor, and at least one memory. The at least one memory stores an instruction set executable by the at least one processor to perform data processing activities. The data processing activities, in some embodiments, include determining whether there are any open orders with regard to a location included in first order input received via the at least one network interface device. When there is at least one open order with regard to the location, the data processing activities include transmitting, via the at least one network interface device, a request for second order input indicating whether to add the order input to the at least one open order or to open a new order. The data processing activities, when the received second order input specifies that a new order is to be opened, include opening a new order with regard to the location based on the first order input. When the received second order input specifies that the received first order input is to be added to one of the at least one open orders, the data processing activities include adding the first order input to one of the at least one open orders.

DETAILED DESCRIPTION

Figure 1:
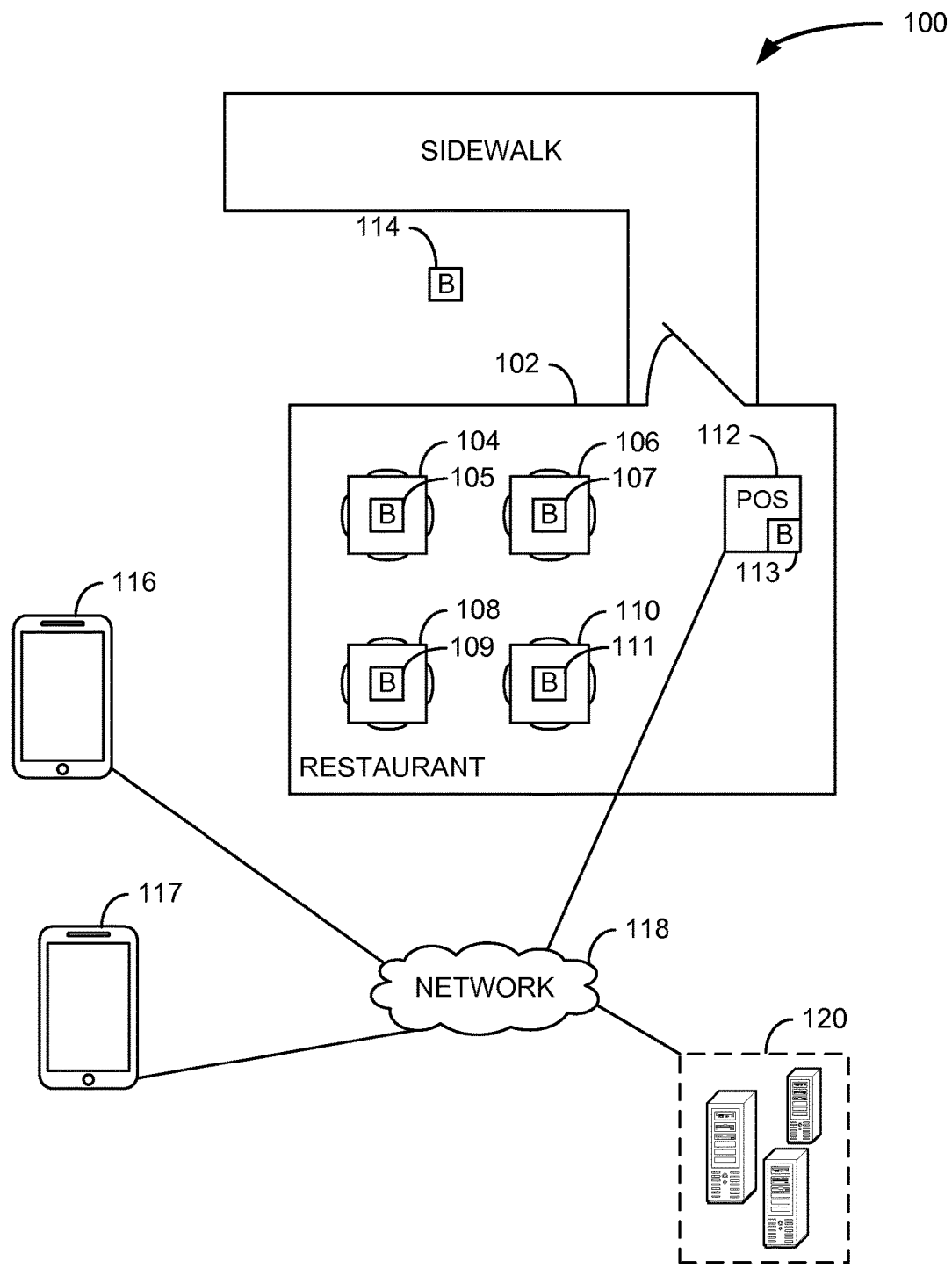
FIG. 1 is a logical block diagram of a system, according to an example embodiment.

Various embodiments herein each include at least one of systems, devices, methods, and software for shared transactions. Some such embodiments may be implemented at retail outlets (e.g., restaurants, salons, stores, etc.) to allow customers to order items, add items to an order at a later time when a new guest arrives, split a bill, and pay all without direct interaction in these regards with retail outlet staff. While many of the embodiments herein are described in a restaurant context, the various embodiments are equally applicable to other contexts where customers may order products and services for delivery to a location.

Some embodiments herein allow for customers to order products and services for delivery at a location, such as a dining table, bar location, kiosk, pickup or drive thru window, or other location of restaurant. The orders may be placed conventionally via restaurant employees or via mobile devices. A placed order may then be viewed on a mobile device regardless of how the order is placed and in some embodiments, additional items may be added via the mobile device. Additionally, should another person arrive and join a current dining party at the location, that individual may add their order via their mobile device, a mobile device provided at the table or other restaurant location, and the like. The newly arriving person may choose to have their order added to a bill of the entire party or to be kept separate. Later, when it is time to pay the bill, the bill for ordered products and services may be a single bill and then split on a mobile device app and shared amongst all or a subset of the individuals of the dining party who may then pay the bill via the mobile device app on their own mobile devices, via a mobile device provided at the table, mobile devices of others, and even with the wait staff.

These embodiments and others are enabled by mobile device apps and backend systems. The backend systems may be local to the restaurant, remote to the restaurant and operated by an operator of the restaurants, or a combination of both.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is illustrated as deployed with regard to a restaurant 102. As mentioned above, some embodiments herein allow for customers to order products and services for delivery at a location, such as a dining table 104, bar location, kiosk, pickup or drive thru window, or other location of restaurant. The orders may be placed conventionally via restaurant employees or via mobile devices 116, 117. A placed order may then be viewed on a mobile device 116, 117 regardless of how the order is placed and in some embodiments, additional items may be added via the mobile device.

Some embodiments of the system 100 operate to associate a customer account maintained in at least one of a backend computing system 120 and a point of sale (POS) terminal 112 with a dining session at the restaurant 102. However, some other embodiments do not require a customer have a customer account.

In an example embodiment, a customer carrying a mobile device 116, 117, such as a smartphone, smartwatch, or tablet, enters the restaurant 102. The customer mobile device 116 typically includes a mobile device app that executes thereon that allows the customer to perform various actions. Such actions may include one or more of creating an account, adding and modifying payment account information, viewing receipts of past dining experiences, and viewing a current bill. The actions may also include adding items to a current order or bill, to make requests to add items to an order of another located at the same table 104, 106, 108, 110, to approve requests from others to add items to their bill, to pay a bill, to split a bill, and the like.

The mobile device app, in some embodiments, is location enabled. The mobile device app in such embodiments receives data via a transceiver device present on a mobile device 116, 117, such as one or both of a BLUETOOTH® device and a WI-FI® device. An example of data that may be received by the mobile device 116 app is data from one or more beacon devices 105, 107, 109, 111, 113, 114 deployed in and around the restaurant 102. The data from the one or more beacon devices 105, 107, 109, 111, 113, 114 typically includes identifiers of the respective beacon devices that enable the mobile device 116 app to determine a location itself or to relay the identifiers to a location service via a network 118 to obtain location information.

In an example embodiment, the beacon devices 105, 107, 109, 111, 113, 114 broadcast a radio signal encoded with identifying data that is registered in the backend system 120 with a known location, such as the POS terminal 112 or a table 104 in the particular restaurant 102. The positioning beacon device, in some embodiments, may include a radio transceiver device, such as a BLUETOOTH® beacon device. Among others, such beacon devices are available from NCR Corporation of Duluth, Ga. The positioning beacon device may also, or alternatively, include a WI-FI® Wireless Access Point (WAP) device in some embodiments. The radio signal, or signals, broadcast by the beacon device are received by the mobile device 116 and the app or the backend system 120 may then determine a location of the mobile device based on one or more of the received signals. The position may also be determined based in part on a signal strength of each of the one or more signals received by the mobile device 116.

The positioning data as determined by one or both of the app on the mobile device 116 and the backend system 120 may then be used to perform different functions such as locating a current customer position, identifying open orders with regard to the location, associating the customer account of a customer carrying the mobile device 116 with a dining session, and the like. For example, the positioning data may result in a determination that the mobile device is located at one of the restaurant 102 tables 104, 106, 108, 110. Based on this determination and a dining session previously initiated with regard to a particular table 104, 106, 108, 110 by wait staff, a greeter on another mobile device, or another customer at the same location, the determined location can be associated with the dining session. However, in some embodiments, upon determining the location of the mobile device 116 at one of the tables 104, 106, 108, 110, the dining session may be initiated or a current dining session at the location may be joined within the app. In other embodiments, to associate a dining session or a portion of a dining session (e.g., where a single group of the dining session is to be billed in two or more checks) wait staff may provide a code of the dining session, or portion thereof. The customer may then enter that code into the mobile device app to associate their customer account with the particular dining session. In additional embodiments, the mobile device 116, 117 app may allow customers at a single location of a single dining session to split the bill into two or more checks which may then be paid within the mobile device app of their own respective mobile devices 116, 117, utilizing a mobile device provided by the restaurant, and the like.

In some embodiments, where a customer account is associated with a dining session, a message or data item may be transmitted from the backend system 120 to one or more wait staff member and the restaurant generally to inform the restaurant and wait staff that when the customer leaves, the bill will be paid automatically. This is to avoid concern that the customer is leaving or has left without paying their bill.

In some embodiments, the mobile device 116 app may be manipulated to view a dining menu. The dining menu may be a part of the app or menu data may be retrieved from the backend system 120 or other network 118 location. In some embodiments, the mobile device 116 app may also allow the customer to select menu items to order and the mobile device 116 communicates the selections to a computing system of the restaurant 102, either directly or via the backend system 120. In these and other embodiments, ordered items may also or alternatively be ordered via conventional wait staff. As items are ordered, data of the ordered items is provided to the backend system 120. The backend system 120 may maintain a record of the ordered items or at least their prices or relay this data to the POS terminal 112 or other terminal in the restaurant 102. In some embodiments, as items are ordered within a dining session, the items may be added to a bill for the entire dining session or to one bill of a plurality of bills of the dining session. This is rather straight forward where the customers are ordering directly through a mobile device 116, 117 on which they have authenticated themselves within the app in association with their customer account. However, a customer need not have an account in all embodiments. Instead, a customer may initiate an anonymous session in some embodiments where the session is associated with a customer sitting in a particular position at a table 104, 106, 108, 110, or as may be otherwise identified in a particular embodiment.

Eventually the dining session ends and the customer or customers need to pay their bill. The mobile device 116, 117 app may provide a selectable option to pay the bill before departing the restaurant 102. The bill will be paid via a payment account associated with the customer account when utilized. However, the mobile device 116, 117 app may also provide an option to request conventional paper bill from the wait staff, which is relayed to the wait staff via the backend system 120. In some embodiments, a customer may input their payment information, such as credit card information, within the mobile device, or utilize a digital wallet function of the mobile device 116, 117 (e.g., APPLE PAY as operated by APPLE, INC. of Cupertino, Calif.) or online digital wallet (e.g., PAYPAL as offered by PAYPAL, INC. of San Jose, Calif.). In some embodiments, when a customer desires the mobile device 116, 117 functionality, the customer may be required to provide payment information at a time of ordering, either through the mobile device app 116, 117 or with the wait staff. In such instances, if the customer does not select such an option in the mobile device 116, 117 app to pay prior to leaving, or the mobile device 116, 117 app does not include an option to initiate payment, the mobile device 116 app will sense when it has departed the restaurant 102.

The mobile device 116 app may sense it has departed the restaurant 102 in various ways in different embodiments. In some embodiments, the mobile device 116 app may no longer be receiving signals from one or more of the beacon devices 105, 107, 109, 111, 113, 114. In some other embodiments, the mobile device app may receive a signal from one or more particular beacon devices, such as beacon device 113 located near the restaurant exit or beacon device 114 that is located outside the restaurant. In an additional embodiment, the mobile device 116 app may obtain or receive positioning data from a positioning device, such as a GPS device of the mobile device 116, or positioning data from another service that operates on the mobile device 116 or retrieves positioning data via the network 118.

Figure 2:
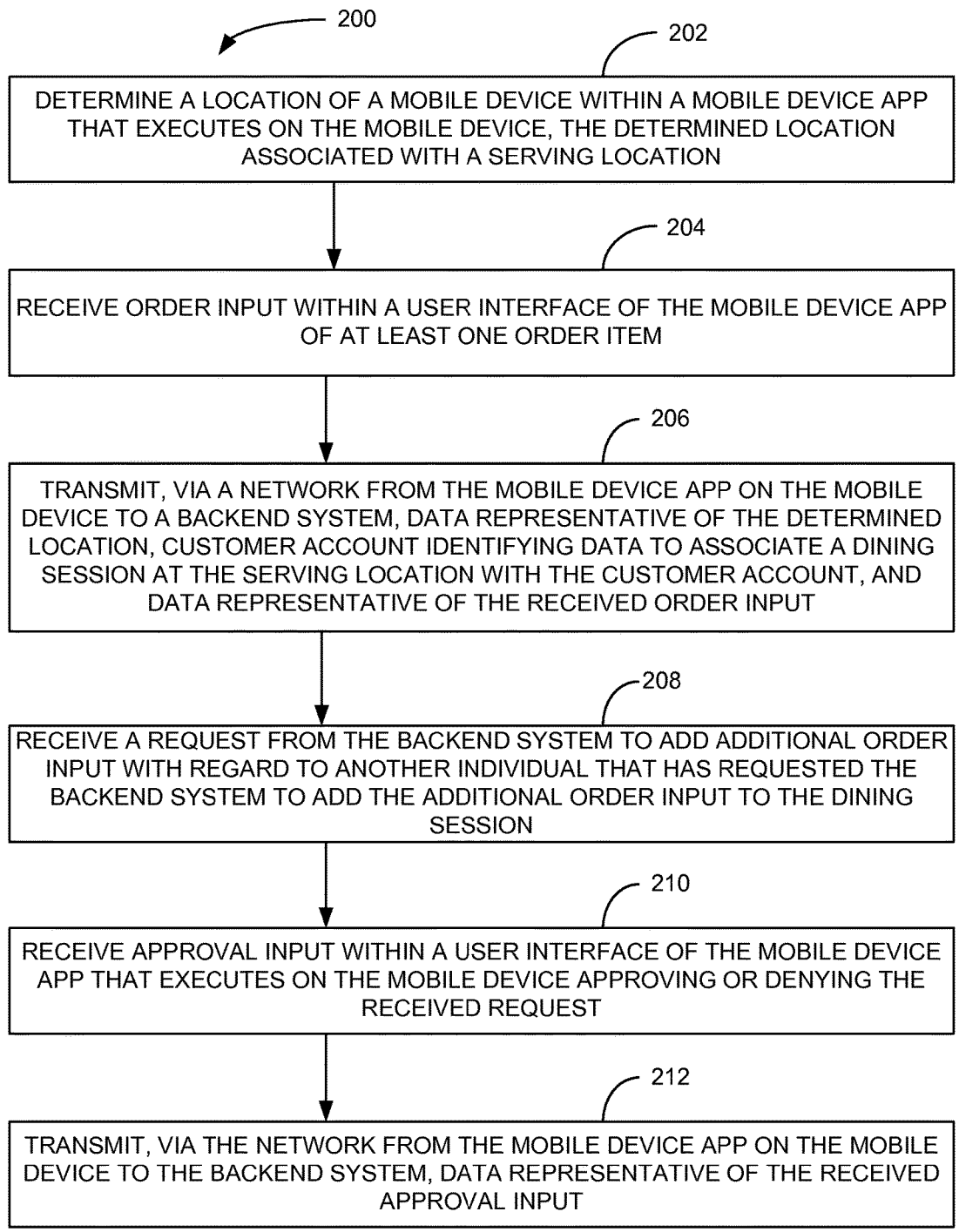
FIG. 2 is a block flow diagram of a method, according to an example embodiment.
Figure 3:
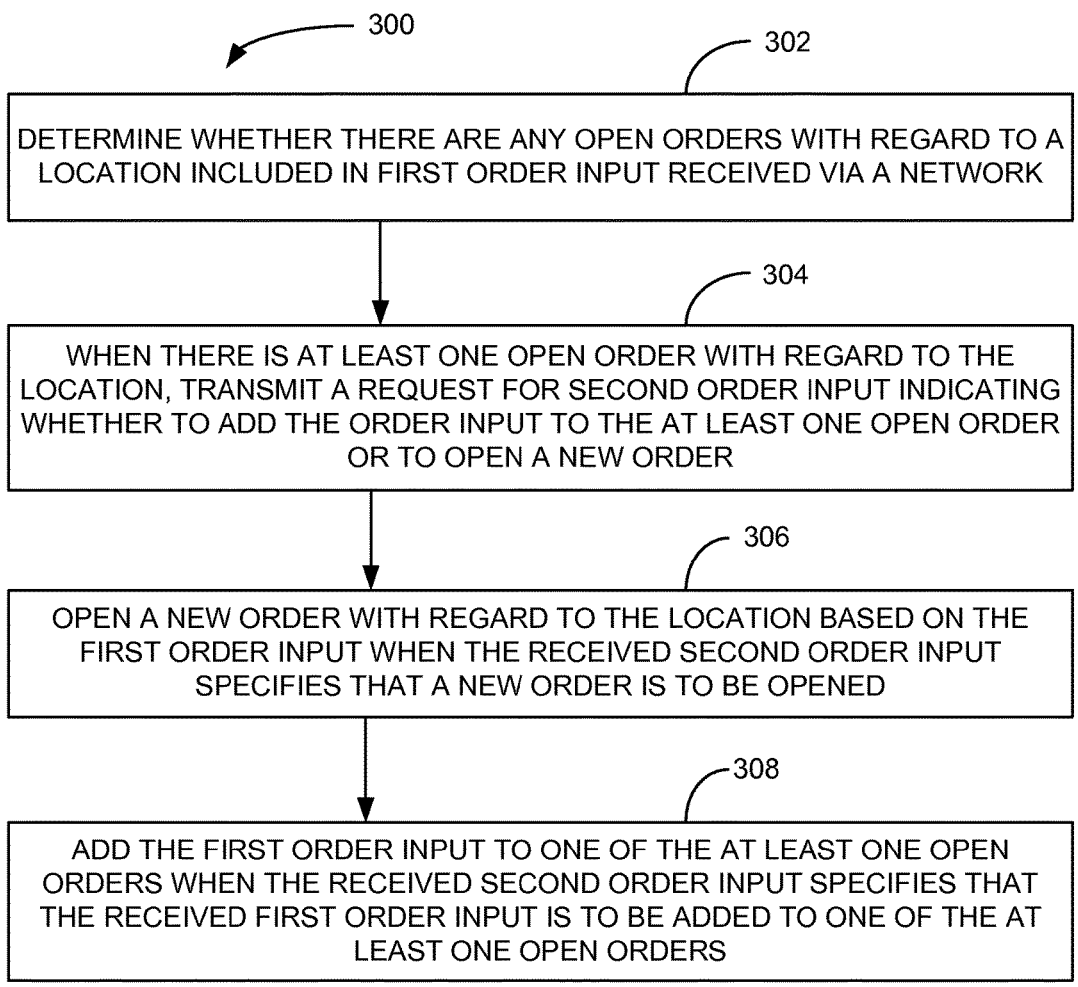
FIG. 3 is a block flow diagram of a method, according to an example embodiment.

Further details of some such embodiments are described with regard to the following methods. For example, the method 200 of FIG. 2 illustrates an example of a method that may be performed by mobile device 116, 117 app according to some embodiments. Further, the method 300 of FIG. 3 is an example of a method that may be performed on the backend system 120 in communication with a mobile device 116, 117 performing the method 200 of FIG. 2.

FIG. 2 is a block flow diagram of a method, according to an example embodiment. The method 200 of FIG. 2 is an example of a method that may be performed by mobile device 116, 117 app according to some embodiments. The method 200 includes determining 202 a location of a mobile device within a mobile device app that executes on the mobile device. The determined 202 location may be associated with a serving location, such as one of the tables 104, 106, 108, 110 of FIG. 1. The method 200 further includes receiving 204 order input within a user interface of the mobile device app of at least one order item. The method 200 then transmits 206, via a network from the mobile device app to a backend system such as the backend system 120, data representative of the determined location, customer account identifying data to associate a dining session at the serving location with the customer account, and data representative of the received order input. The method 200 may then receive 208 a request from the backend system to add additional order input with regard to another individual that has requested the backend system to add the additional order input to the dining session. Such input may be received when another person joins a dining party later or when another person simply orders later and wants to add their order to a single bill for the entire party or to the bill of another person. The method 200 additionally includes receiving 210 approval input within a user interface of the mobile device app that executes on the mobile device approving or denying the received request. The received 210 order input is then transmitted 212, via the network from the mobile device app on the mobile device to the backend system.

Some embodiments of the method 200 further include receiving, via the network from the backend system by the mobile device app, menu data of items available for order at the serving location and presenting, on a display of the mobile device, at least one view generated based on the received menu data. In such embodiments, receiving 204 the order input includes receiving input with regard to at least one item presented in the at least one view of the received menu data. The menu in such embodiments may be interactive on the mobile device and provide additional information with regard to menu items. The additional information may be nutritional information, wine pairing suggestions, among other information.

Some other embodiments of the method 200 include receiving, via the network from the backend system by the mobile device app, data indicating the customer account does not include associated payment data. Such embodiments may then present, on a display of the mobile device, a user interface to receive payment data to associate with the customer account. Data representative of the payment data received within the user interface may then be transmitted to the backend system.

In some embodiments of the method 200, determining 202 the location of the mobile device includes receiving at least one beacon identifier within the mobile device app from a radio transceiver device of the mobile device and determining the location based at least in part on the at least one beacon identifier. Determining the location based at least in part on the at least one beacon identifier includes transmitting each of the at least one beacon identifiers to a location service via the network, such as to a service of the backend system 120, and receiving location identifying data in response.

An additional embodiment of the method 200 includes receiving input with regard to the dining session to split an amount due with at least one other and input identifying each of the at least one other. These embodiments then transmit a message to each of the identified one others regarding the amount due. The transmitted message may be an intra-app message including a dining session identifier enabling linking to a payment function for the dining session, a text message including a hyperlink to a website at which a payment may be made, and the like. Such embodiments of the method 200 further include receiving payment input for a portion of the amount due and transmitting, to the backend system, a payment authorization for the portion of the amount due.

FIG. 3 is a block flow diagram of a method, according to an example embodiment. The method 300 of FIG. 3 is an example of a method that may be performed on the backend system 120 of FIG. 1 in communication with a mobile device 116, 117 performing the method 200 of FIG. 2.

The example method 300 includes determining 302 whether there are any open orders with regard to a location included in first order input received via a network. When there is at least one open order with regard to the location, such as a table associated with a beacon identifier or user input included in the received input, the method 300 includes transmitting 304 a request for second order input indicating whether to add the order input to the at least one open order or to open a new order. The method 300, when the received second order input specifies that a new order is to be opened, opens 306 a new order with regard to the location based on the first order input. However, when the received second order input specifies that the received first order input is to be added to one of the at least one open orders, the method 300 adds 308 the first order input to one of the at least one open orders.

Data of the orders is stored and maintained by the backend system 120 in stored data. The stored data may be stored on disk, in a database under control of a database management system, and the like.

In some embodiments, when the determining 302 whether there are any open orders with regard to the location determines there are a plurality of open orders, the method 300 includes retrieving data representative of each open order. Further in such embodiments, transmitting 304 the request for second order input indicating whether to add the received first order input to the at least one open order or to open a new order includes transmitting data representative of each of the at least one open orders and requesting input of which of the at least one open orders to add the received first order input. Further, adding 308 the first order input to one of the at least one open orders includes adding the first order input to a specific open order identified in the received second order input.

In some embodiments of the method 300, the first and second order inputs are received via the network from a mobile device app that executes on a mobile device of a first user. Some such embodiments of the method 300 further include transmitting a request for approval input authorizing the adding 308 of the first order input to the at least one open order. In such embodiments. The adding 308 of the first order input is performed only upon receipt of approval input.

Some embodiments of the method 300 further include receiving a one or a plurality of payment authorizations with regard to a single open order from one or a plurality of payment accounts. In such embodiments, a sum of the one or more payment authorizations is at least equal to a total cost of the single order. However, the payment authorizations may be more than the total cost, such as when a tip is added.

Figure 4:
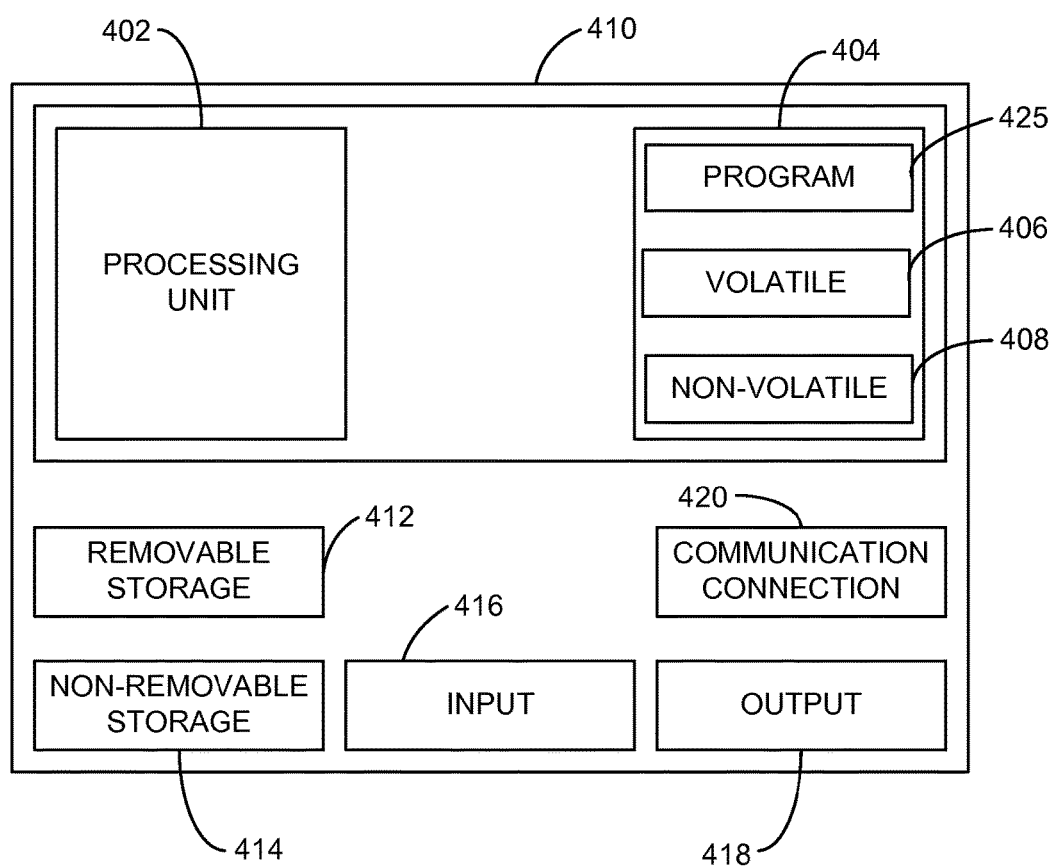
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   determining whether there are any open orders with regard to a location included in first order input received via a network;
   when there is at least one open order with regard to the location, transmitting a request for second order input indicating whether to add the first order input to the at least one open order or to open a new order;
   opening a new order with regard to the location based on the first order input when the received second order input specifies that a new order is to be opened;
   adding the first order input to one of the at least one open orders when the received second order input specifies that the received first order input is to be added to one of the at least one open orders; and
   wherein:
      the first and second order inputs are received via the network from a mobile device app that executes on a mobile device of a first user;
      the location included in the first order input is determined based on at least one beacon identifier received within the mobile device app from a radio transceiver device of the mobile device.

2. The method of claim 1, wherein:
   when the determining whether there are any open orders with regard to the location determines there are a plurality of open orders; retrieving data representative of each open order; and
   transmitting the request for second order input indicating whether to add the received first order input to the at least one open order or to open a new order includes transmitting data representative of each of the at least one open orders and requesting input identifying one of the at least one open orders to add the received first order input to; and
   adding the first order input to one of the at least one open orders includes adding the first order input to a specific open order identified in the received second order input.

3. The method of claim 1, further comprising:
   transmitting a request for approval input, the approval input for authorizing the adding of the first order input to the at least one open order identified in the received second order input, to a mobile device app that executes on a mobile device of a second user from which the open order was received to which the first order input is to be added, once authorized, based on the second order input; and
   wherein the adding of the first order input is performed only upon receipt of approval input.

4. The method of claim 1, wherein the location included in the first order input includes an identifier of at least one beacon device located in proximity to the location.

5. The method of claim 1; further comprising:
   correlating the location to a serving location of a facility based on location data associated with each of a plurality of serving locations of the facility.

6. The method of claim 1, further comprising:
   receiving payment authorizations with regard to a single open order from each of a plurality of payment accounts, a sum of the payment authorizations at least equal to a total cost of the single order.

7. A method comprising:
   determining a location of a mobile device within a mobile device app that executes on the mobile device, the determined location associated with a serving location and determined based on at least one beacon identifier received within the mobile device app from a radio transceiver device of the mobile device;
   receiving order input within a user interface of the mobile device app of at least one order item;
   transmitting, via a network from the mobile device app on the mobile device to a backend system, data representative of the determined location, customer account identifying data to associate a dining session at the determined location with the customer account, and data representative of the received order input;
   receiving a request from the backend system to add additional order input with regard to another individual that has requested the backend system to add the additional order input to the dining session;
   receiving approval input within a user interface of the mobile device app that executes on the mobile device approving or denying the received request; and
   transmitting, via the network from the mobile device app on the mobile device to the backend system, data representative of the received approval input.

8. The method of claim 7, further comprising:
   receiving, via the network from the backend system by the mobile device app that executes on the mobile device; menu data of items available for order at the serving location;
   presenting, on a display of the mobile device, at least one view generated based on the received menu data; and
   wherein receiving the order input includes receiving input with regard to at least one item presented in the at least one view of the received menu data.

9. The method of claim 7, further comprising:
   receiving, via the network from the backend system by the mobile device app that executes on the mobile device, data indicating the customer account does not include associated payment data;

presenting, on a display of the mobile device, a user interface to receive payment data to associate with the customer account; and transmitting, via the network from the mobile device app on the mobile device to the backend system, data representative of payment data received within the user interface to associate with the customer account.

10. The method of claim 7, wherein determining the location based at least in part on the at least one beacon identifier includes transmitting each of the at least one beacon identifiers to a location service via the network and receiving location identifying data in response.

11. The method of claim 7, further comprising:
receiving input with regard to the dining session to split an amount due with at least one other and input identifying each of the at least one other;
transmitting a message to each of the identified one others regarding the amount due;
receiving payment input for a portion of the amount due; and
transmitting, to the backend system, a payment authorization for the portion of the amount due.

12. A system comprising:
at least one network interface device;
at least one processor;
at least one memory; and
an instruction set, stored in memory and executable by the at least one processor to perform data processing activities, the data processing activities comprising:
determining whether there are any open orders with regard to a location included in first order input received via the at least one network interface device;
when there is at least one open order with regard to the location, transmitting a request for second order input indicating whether to add the first order input to the at least one open order or to open a new order;
opening a new order with regard to the location based on the first order input when the received second order input specifies that a new order is to be opened;
adding the first order input to one of the at least one open orders when the received second order input specifies that the received first order input is to be added to one of the at least one open orders; and
wherein:
the first and second order inputs are received via the network from a mobile device app that executes on a mobile device of a first user;
the location included in the first order input is determined based on at least one beacon identifier received within the mobile device app from a radio transceiver device of the mobile device.

13. The system of claim 12, further comprising:
a database management system storing order data of open orders; and
wherein the determining whether there are any open orders with regard to a location included in first order input includes querying the database management system.

14. The system of claim 13, wherein:
when the determining whether there are any open orders with regard to the location determines there are a plurality of open orders, retrieving data representative of each open order from the database management system; and
the request for second order input indicating whether to add the received first order input to the at least one open order or to open a new order includes transmitting data representative of each of the at least one open orders and requesting input identifying one of the at least one open orders to add the received first order input to; and
adding the first order input to one of the at least one open orders includes adding the first order input to a database record of the specific open order identified in the received second order input.

15. The system of claim 12, wherein the data processing activities further comprise:
transmitting, via the at least one network interface device, a request for approval input, the approval input for authorizing the adding of the first order input to the at least one open order identified in the received second order input to a mobile device app that executes on a mobile device of a second user from which the open order was received to which the first order input is to be added, once authorized, based on the second order input; and
wherein the adding of the first order input is performed only upon receipt of approval input.

16. The system of claim 12, wherein the location included in the first order input includes an identifier of at least one beacon device located in proximity to the location.

17. The system of claim 12, wherein the data processing activities further comprise:
receiving, via the at least one network interface device, third order input to add additional order items with regard to another person.

* * * * *